(12) United States Patent
Waclawek et al.

(10) Patent No.: US 10,732,097 B2
(45) Date of Patent: Aug. 4, 2020

(54) PHOTOTHERMAL INTERFEROMETRY APPARATUS AND METHOD

(71) Applicant: TECHNISCHE UNIVERSITÄT WIEN, Vienna (AT)

(72) Inventors: Johannes Paul Waclawek, Vienna (AT); Bernhard Lendl, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 39 days.

(21) Appl. No.: 16/310,261

(22) PCT Filed: Jul. 12, 2017

(86) PCT No.: PCT/AT2017/060174
§ 371 (c)(1),
(2) Date: Dec. 14, 2018

(87) PCT Pub. No.: WO2018/009953
PCT Pub. Date: Jan. 18, 2018

(65) Prior Publication Data
US 2019/0195781 A1    Jun. 27, 2019

(30) Foreign Application Priority Data
Jul. 13, 2016  (AT) .............................. A 50624/2016

(51) Int. Cl.
*G01N 21/17* (2006.01)
*G01J 3/26* (2006.01)
*G01N 21/39* (2006.01)

(52) U.S. Cl.
CPC .............. *G01N 21/171* (2013.01); *G01J 3/26* (2013.01); *G01N 21/1717* (2013.01);
(Continued)

(58) Field of Classification Search
CPC .. G01N 21/00; G01N 21/171; G01N 21/1717; G01N 2021/1725; G01N 2021/1704; G01J 3/26
See application file for complete search history.

(56) References Cited

U.S. PATENT DOCUMENTS

2002/0094580 A1* 7/2002 Jorgenson ............ G01N 21/171
                                                            436/151
2014/0076055 A1* 3/2014 Asao ........................ G01H 9/00
                                                            73/655
(Continued)

FOREIGN PATENT DOCUMENTS

DE          4231214 A1    3/1994
WO       2012031208 A2    3/2012

OTHER PUBLICATIONS

Campillo, A. et al., "Fabry-Perot photothermal trace detection," Applied Physics Letters, vol. 41, No. 4, Aug. 15, 1982, 4 pages.
(Continued)

*Primary Examiner* — Jonathan M Hansen
(74) *Attorney, Agent, or Firm* — McCoy Russell LLP

(57) ABSTRACT

A photothermal interferometry apparatus and method for detecting a molecule in a sample, in particular for detecting a trace gas species, comprising: a Fabry-Perot interferometer with a first mirror, a second mirror and a first cavity for containing the sample extending between the first and the second mirror, a probe laser for passing a probe laser beam through the first cavity of the Fabry-Perot interferometer, an excitation laser for passing an excitation laser beam through the first cavity of the Fabry-Perot interferometer for exciting the molecule in the sample, and a photodetector unit for detecting the transmitted probe laser beam passed through the first cavity of the Fabry-Perot interferometer.

20 Claims, 3 Drawing Sheets

(52) U.S. Cl.
CPC ..... *G01N 21/39* (2013.01); *G01N 2021/1704* (2013.01); *G01N 2021/1712* (2013.01); *G01N 2021/1725* (2013.01)

(56) References Cited

U.S. PATENT DOCUMENTS

2016/0054179 A1* 2/2016 Carr .......................... G01J 3/10
356/454
2016/0139038 A1* 5/2016 Oldsen ............... G01N 21/0303
356/454

OTHER PUBLICATIONS

Yip, B., "Trace detection in gases using photoacoustic spectroscopy and Fabry-perot interferometry," Doctor of Philosophy Dissertation, Iowa State University, Department of Chemistry, Available as Early as Jan. 1984, 212 pages.

Yip, B. et al., "Wavelength-Modulated Fabry-Perot Interferometry for Quantitation of Trace Gas Componenets," Analytica Chimica Acta, vol. 169, Dec. 1985, 5 pages.

Pellegrino, P. et al., "Trace chemical vapor detection by photothermal interferometry," Proceedings of SPIE 4205, Advanced Environmental and Chemical Sensing Technology: Environmental and Industrial Sensing, Nov. 5, 2000, Boston, Massachusetts, 8 pages.

Tittel, F. et al., "Mid-Infrared Laser Applications in Spectroscopy," Topics in Applied Physics, vol. 89, Jun. 13, 2003, 72 pages.

Waclawek, J. et al., "Compact quantum cascade laser based quartz-enhanced photoacoustic spectroscopy sensor system for detection of carbon disulfide," Optics Express, vol. 24, No. 6, Mar. 21, 2016, 14 pages.

Yang, F. et al., "Hollow-core fiber Fabry-Perot photothermal gas sensor," Optics Letters, vol. 41, No. 13, Jul. 1, 2016, 4 pages.

ISA European Patent Office, International Search Report Issued in Application No. PCT/AT2017/060174, Oct. 23, 2017, WIPO, 3 pages.

* cited by examiner

PHOTOTHERMAL INTERFEROMETRY APPARATUS AND METHOD

CROSS-REFERENCE TO RELATED APPLICATIONS

The present application is a U.S. National Phase of International Patent Application Serial No. PCT/AT2017/060174 entitled "PHOTOTHERMAL INTERFEROMETRY APPARATUS AND METHOD," filed on Jul. 12, 2017. International Patent Application Serial No. PCT/AT2017/060174 claims priority to Austrian Patent Application No. A 50624/2016, filed on Jul. 13, 2016. The entire contents of each of the above-cited applications are hereby incorporated by reference in their entirety for all purposes.

TECHNICAL FIELD

The invention generally relates to the field of photothermal interferometry for detecting a molecule in a sample, in particular for detecting a trace gas species.

BACKGROUND

As is well known in the prior art, the absorption of photons induces an excitation of molecular energy levels, which in turn may lead to a change of the sample temperature, pressure and density. Changes of these properties may be used for trace detection in photothermal spectroscopy (PTS). The techniques use laser radiation to generate transient changes of the sample properties; if the temperature rise caused by photo-absorption is fast enough a pressure change within the sample is generated, which will disperse in an acoustic wave. Once the pressure has relaxed to the equilibrium pressure, a density change proportional to the temperature will remain. In combination, temperature and density changes affect other properties of the sample, such as the refractive index. PTS methods are based on changes in the sample temperature, typically monitored trough the refractive index of the sample. In contrast to classical transmission spectroscopy according to Lambert-Beer law where sensitivity is increased with path length, PTS is an indirect method for optical absorption analysis, which measures a photo-induced change in the thermal state of the sample. For this reason, PTS offers the possibility for sensor miniaturization. PTS signals are generally proportional to the temperature change and inversely proportional to the excitation volume. The latter arises because higher temperature changes can be induced in smaller volumes with a given power, and also because PT signals may be derived from a spatial gradient in the resulting refractive index change. The deposited heat power is proportional to the absorption coefficient of the sample and the incident light intensity.

PTS setups detecting refractive index changes typically employ an excitation laser source for sample heating and a probe laser source to monitor changes resulting from heating. The change in the refractive index cause a phase shift of light passing through the heated sample which can be measured with high sensitivity using an interferometer.

It was already proposed in the art to use Fabry-Perot interferometers (FPI) for photothermal trace gas detection, see for example A. J. Campillo, S. J. Petuchowski, C. C. Davis, and H.-B. Lin "Fabry-Perot photothermal trace detection", Appl. Phys. Lett. 41(4), 327-329 (1982) or B. C. Yip, and E. S. Yeung, "Wavelength modulated Fabry-Perot Interferometry for quantitation of trace gas componentes," Anal. Chim. Acta 169, 385-389 (1985).

Fabry-Perot interferometers use an optical cavity for multi-wave interference instead of a single-pass interferometer design. The FPI comprises two parallel partially reflecting mirrors within a beam undergoes multiple reflections. Refractive index changes can be measured comparatively easily by measuring the transmitted light intensity through the FPI, which is dependent on the phase shift of the light.

Such design was also proposed in Yip, "Trace detection in gases using photoacoustic spectroscopy and Fabry-Perot interferometry" (1984). In a dual-beam arrangement, two parallel optical paths are introduced into the interferometer by splitting the output of a single-frequency laser, one for the sample interaction chamber which contains the species of interest, the other for a reference chamber containing the buffer gas only. In this way, residual background absorption can be accounted for when both the reference and sample chambers are irradiated with the excitation beam.

Thus, in distinction from the invention the arrangement of Yip provides for the irradiation of both chambers with the excitation beam and furthermore that merely the sample interaction chamber, not the reference chamber contains the species of interest.

However, experimental results from the applicants suggest that the known arrangement of Yip is incapable of sufficiently eliminating acoustic and thermal noise as well as compensating for changes in the composition of the matrix.

The article Yang et. al., "Hollow-core fiber Fabry-Perot photothermal gas sensor", Optics Letters, Vol. 41, No. 13 discloses a trace gas sensor based on photothermal effect in a hollow-core fiber Fabry-Perot interferometer. A reference gas cell is used to estimate the gas concentration by directly measuring the attenuation of the transmitted light.

However, the photothermal interferometry setups proposed in the prior art entailed a number of drawbacks. First, the transmission signal was prone to probe laser phase noise, probe laser intensity noise, acoustic noise and mechanical noise. Second, the known setups lacked stability so that use was essentially restricted to laboratory environments. For example, in the prior art moveable parts, such as piezo elements for adjusting the distance between the FPI cavity mirrors, were used to tune the transmission of the probe laser radiation through the FPI cavity. Third, the selectivity and sensitivity was insufficient in certain applications. Fourth, considering gas sensing in a complex gas matrix with varying composition and/or varying temperature the refractive index of the matrix is varying, too. This in turn will lead to a change in the measured probe laser intensity independent of the analyte concentration. Thus, to allow for optimal and constant coupling to the cavity it is suggested to adjust the cavity length. This adds to complexity and instability of the overall measurement system.

It is an object to alleviate or eliminate at least one of the drawbacks of the prior art.

According to an aspect of the invention, a photothermal interferometry apparatus for detecting a molecule in a sample, in particular for detecting a trace gas species, comprises:

a Fabry-Perot interferometer with a first mirror, a second mirror and a first cavity for containing the sample extending between the first and the second mirror, a probe laser arrangement with at least one probe laser for providing a first probe laser beam and a second probe laser beam, an excitation laser for passing an excitation laser beam through the first cavity of the Fabry-Perot interferometer for exciting the molecule in the sample, the Fabry-Perot interferometer comprising a third mirror, a fourth mirror and a second cavity for containing the sample extending between the third and the fourth mirror, the first and the second cavity of the Fabry-Perot interferometer being arranged such that the first probe laser beam intersects with the excitation laser beam in the first cavity and the second probe laser beam does not intersect with the excitation laser beam in the second cavity, a photodetector unit comprising a first photo detector for detecting the transmitted first probe laser beam and a second photo detector for detecting the transmitted second probe laser beam.

In a preferred embodiment, the probe laser arrangement comprises a beam splitter for splitting a probe laser beam from the probe laser into the first and second probe laser beam. Thus, in this embodiment, the probe laser beam is split into a first and a second probe laser beam before being passed through the first and second cavity of the Fabry-Perot interferometer, respectively. Alternatively, the probe laser arrangement comprises two probe lasers, the first probe laser being arranged for providing the first probe laser beam for the first cavity and the second probe laser being arranged for providing the second probe laser beam for the second cavity.

In the first cavity, the first probe laser beam passes through the sample (containing the molecule of interest, i.e. the analyte) heated by the excitation laser beam such that the transmission of the first probe laser beam detected in the first photo detector is influenced by the heating of the sample with the excitation laser beam. In the second cavity, the second probe laser beam passes through the same sample but unaffected by heating with the excitation laser beam. The second photo detector receives the transmission of the second probe laser beam. In this way, the first probe laser beam probes both noise, in particular probe laser phase noise and surrounding noise (mechanical and acoustical noise) as well as noise due to changing matrix composition, and the photothermal phase shift spectroscopy (PTPS) signal, whereas the second probe laser beam probes only such noise. By comparing the output signals of the first and the second photo detector, the noise may be isolated from the desired PTPS signal. Thus, the different noise contributions may be eliminated or at least greatly reduced with a simple, reliable set-up that does not affect the sensitivity of the measurements. It is a particular advantage of this two-beam set-up that the transmitted first probe laser beam and the transmitted second probe laser beam may be detected simultaneously.

In a preferable embodiment, the photothermal interferometry apparatus further comprises a subtractor for subtracting a second transmission signal corresponding to the transmitted second probe laser beam from a first transmission signal corresponding to the first transmitted probe laser beam.

In a preferable embodiment, the first and the third mirror are formed by a first and a second section of a first mirror element, the second and the fourth mirror are formed by a first and a second section of a second mirror element such that the first and the second cavity extend continuously between the first and second mirror element.

In this embodiment, the first and the second cavity extend continuously between the first and the second mirror element. The first probe laser beam intersects the excitation laser beam in the first cavity, whereas the second probe laser beam passes the excitation laser beam in the second cavity.

However, in an alternative embodiment, the first and the third mirror and the second and the fourth mirror, respectively, may be separate such that the first and the second cavity may extend separately. It is crucial, however, that the first and the second cavity contain the same sample in order to isolate the noise in the PTPS signal.

In a preferable embodiment, the first probe laser beam runs essentially perpendicularly to the excitation laser beam in the first cavity. In this embodiment, the first and the second probe laser beam may be guided in parallel through the first and the second cavity, respectively.

In an exemplary embodiment, one of the first and the second probe laser beam may be deflected for example by 90 degrees, in particular by means of reflection (for example with a mirror or prism), after emerging from the beam splitter.

In another exemplary embodiment, a beam splitting mirror is used as beam splitter for forming the first and the second probe laser beam with a lateral spacing from each other.

According to an aspect of the invention, a photothermal interferometry apparatus for detecting a molecule in a sample, in particular for detecting a trace gas species, comprises:

a Fabry-Perot interferometer with a first and a second mirror and a first cavity for containing the sample extending between the first and the second mirror, a probe laser for passing a probe laser beam through the first cavity of the Fabry-Perot interferometer, an excitation laser for passing an excitation laser beam through the first cavity of the Fabry-Perot interferometer for exciting the molecule in the sample, a photodetector unit for detecting the transmitted probe laser beam passed through the first cavity of the Fabry-Perot interferometer.

A preferred embodiment comprises a beam splitter for splitting the probe laser beam into a first and a second probe laser beam and a first and a second photo detector for detecting the transmitted first probe laser beam intersecting the excitation laser beam and the transmitted second probe laser beam not intersecting the excitation laser beam, as described above.

However, some or all of following features may also be used in embodiments without such beam splitter, in particular in an arrangement with a single probe laser beam.

In a preferred embodiment, the photothermal interferometry apparatus further comprises a modulator for modulating the wavelength of the excitation laser beam, the photodetector unit being arranged for detecting a modulation of the transmitted probe laser beam passed through the first cavity of the Fabry-Perot interferometer.

In a preferred embodiment, the photodetector unit communicates with a control unit arranged for determining a harmonic, in particular a second harmonic, of the modulation of the probe laser beam passed through the first cavity of the Fabry-Perot interferometer. In this embodiment, the control unit comprises a demodulator for detecting a nth harmonic of the transmitted probe laser beam.

In a preferred embodiment, the control unit comprises a lock-in amplifier. In this embodiment, the lock-in amplifier serves as demodulator for detecting a nth harmonic of the transmitted probe laser beam.

Thus, PTS signal generation preferably is performed by periodic sample heating using modulated excitation radiation. Preferably modulation is accomplished by wavelength modulation (WM) where the emission frequency of the excitation laser is modulated. Wavelength modulation spectroscopy (WMS) is able to increase the signal to noise ratio (SNR) by reduction of the noise content of a measurement used for trace detection. By WM the absorption of the excitation laser beam is transformed into a periodic signal which preferably is isolated by a lock-in amplifier at its harmonics. This type of detection results in a significant improvement in the signal-to-noise ratio (SNR) by restriction of the detection pass band to a narrow frequency interval, as well as by shifting the detection to higher frequencies, where the 1/f laser noise is significantly reduced.

WM and second harmonic detection in particular (2f WM) offers the advantage that the detected signal is sensitive to spectral shape or curvature rather than absolute absorption levels. For example, by slowly tuning the center frequency over an absorption line, a spectrum which is roughly proportional to the second derivative may be obtained. Selectivity is furthermore increased by 2f detection because of efficient elimination of linear slops of spectra which greatly suppresses signals originating from broad featureless absorptions, such as undesired absorptions originating from the cell and its components, or pressure-broadened bands of large polyatomic molecules. These background absorptions are relatively flat in the observed wavelength region and thus only a tiny signal will be observed.

In a preferred embodiment, the photothermal interferometry apparatus further comprises a first tuner for tuning the probe laser beam over a first given wavelength range. This embodiment allows for fixing the probe laser wavelength via a feedback loop at around the inflection point of the transmission function of the FPI which is particularly favorable for obtaining good results in the measurements. The tuning of the probe laser may be done by adapting temperature and/or injection current, as is well known in the art.

In a preferred embodiment, the photothermal interferometry apparatus further comprises a second tuner for tuning the excitation laser beam over a second given wavelength range. The tuning of the excitation laser may be done by adapting temperature and/or injection current. Tuning of the excitation laser is particularly advantageous for the purpose of multi-analyte determinations.

For avoiding moveable components, the first and second mirror preferably are arranged immovably in a constant distance from each other. Thus, in this embodiment the first and second mirror are static and their relative arrangement need not be adjusted. This allows for a particularly stable set-up.

In a preferred embodiment, the Fabry-Perot interferometer comprises a sample cell for containing the sample, the first and the second mirror being fixed on a first and second side of the sample cell. In this way, the first and the second mirror are arranged in a constant distance from each other on opposite sides of the sample cell. This provides for a very stable arrangement suitable for mobile use.

In a preferable embodiment, an entry and an exit window for the excitation laser beam preferably are arranged opposite one another on the sample cell. The entry window may be arranged on a third side of the sample cell, whereas the exit window is arranged on a fourth side of the sample cell. In this way, the excitation laser beam may intersect the probe laser beam essentially perpendicularly in the first cavity.

In another embodiment, the probe laser beam may be collinear with the excitation laser beam in the first cavity inside the sample cell. In this embodiment, the excitation laser beam may be passed into and out of the sample cell through the first and second mirror of the Fabry-Perot interferometer.

In a preferred embodiment, the sample cell of the Fabry-Perot interferometer comprises a sample inlet and a sample outlet. The sample may be introduced to the first cavity in the sample cell through the sample inlet. After interaction with the excitation laser beam the sample leaves the sample cell through the sample outlet. In one preferred embodiment, the sample inlet is separate from the sample outlet. This embodiment is particularly suitable for actively passing a sample into the gas cell through the gas inlet and withdrawing the sample from the gas cell through the gas outlet. In another preferred embodiment, the sample inlet and the sample outlet are formed by a single opening which allows for diffusion of a sample into the sample cell.

In a preferred embodiment, the sample cell is a gas cell for containing a sample gas. However, the technology described herein is also suitable for investigation of liquid samples.

In a preferred embodiment, the photothermal interferometry apparatus further comprises a vacuum device connected to the sample outlet of the Fabry-Perot interferometer. The vacuum device is arranged for lowering the pressure inside the sample cell to a level below atmospheric pressure. The line shape of a molecular absorption depends on the sample gas pressure. At atmospheric pressure line shapes are broadened due to molecular collisions. As the sample pressure is reduced by means of the vacuum device the pressure broadened linewidth decreases preferably until thermal motion broadening dominates which will increase line shape curvature and thus sensitivity. Also selectivity will be greatly improved when the target absorption lines are resolved from interferents in a multi-gas sample such as water vapor.

In a preferred embodiment, the photothermal interferometry apparatus further comprises
a reference cell containing the sample, the reference cell being arranged, in the path of the excitation laser beam such that the excitation laser beam is passed through the sample in the reference cell,
a photo diode for detecting the excitation laser beam passed through the reference cell.

The photo diode preferably is connected to a further lock-in amplifier for demodulating an odd harmonic, preferable the third harmonic, of the transmitted excitation laser beam.

In this way, the accuracy of the measurements is further increased. In particular, the excitation laser beam may be fixed by a feedback loop to an absorption line of the sample such that a drift in the measurement may be avoided. Furthermore, the data acquisition time may be reduced. Also, the sensitivity may be improved.

In a preferred embodiment, the excitation laser is a diode laser, preferably a continuous wave quantum cascade laser, in particular a continuous wave distributed feedback quantum cascade laser, or an external cavity quantum cascade laser or an interband cascade laser, and/or wherein the probe laser is a diode laser, preferably a single mode diode laser, for example a continuous wave distributed feedback diode laser or external cavity quantum cascade laser. In this embodiment, the wavelength of the excitation laser and/or the wavelength of the probe laser may be tunable. Using a diode laser as excitation laser allows for wavelength modulation of the excitation laser beam by means of current tuning, which is particularly favorable in that no moveable components are required for this purpose. This yields a particularly stable apparatus.

According to another aspect of the invention, a method for detecting a molecule, in particular a trace gas species, in a sample using photothermal spectroscopy, comprises the steps of:

providing a probe laser beam, directing the probe laser beam through the sample in a first cavity of a Fabry-Perot interferometer, providing an excitation laser beam for heating the sample in the first cavity of the Fabry-Perot interferometer, directing the excitation laser beam through the first cavity of the Fabry-Perot interferometer, detecting the transmitted probe laser beam passed through the first cavity of the Fabry-Perot interferometer.

According to another aspect of the invention, a method for detecting a molecule, in particular a trace gas species, in a sample using photothermal spectroscopy, comprises the steps of:

providing a first and a second probe laser beam, preferably by splitting a probe laser beam into a first and a second probe laser beam, directing the first probe laser beam through the sample in a first cavity of a Fabry-Perot interferometer, directing the second probe laser beam through the sample in a second cavity of the Fabry-Perot interferometer, providing an excitation laser beam for heating the sample in the first cavity of the Fabry-Perot interferometer, directing the excitation laser beam through the sample in the first cavity of the Fabry-Perot interferometer, detecting the transmitted first probe laser beam, detecting the transmitted second probe laser beam.

The method preferably further comprises the step of subtracting a second transmission signal corresponding to the transmitted second probe laser beam from a first transmission signal corresponding to the transmitted first probe laser beam.

In a preferred embodiment, the method further comprises the steps of detecting a thermal wave in the sample with the transmitted first probe laser beam (8a) and detecting an acoustic wave in the sample with the transmitted second probe laser beam (8b).

Thus, the dual-beam arrangement described above is arranged for independently measuring the thermal wave and the acoustic wave induced by the interaction of the sample with the excitation laser beam in the first cavity. The thermal wave is observed through the first probe laser beam. The acoustic wave travels from the first cavity to the second cavity (which may be formed continuous with the first cavity) and thus influences the sample contained in the second cavity. The acoustic wave in the second cavity is observed through the second probe laser beam. The thermal wave and the acoustic wave have different properties. The thermal wave undergoes stronger attenuation having a wavelength below 1 mm. For this reason, the thermal wave may only be observed in the first cavity which is defined by the interaction with the excitation laser beam. The acoustic wave shows less attenuation having a wavelength of above 1 cm. This set-up improves the limit of detection of the molecule of interest as changes in the refractive index of opposite signs result from the thermal and acoustic wave, respectively. The temperature increase for the thermal wave leads to a decrease in the density of the sample, whereas the compression wave (acoustic wave) results in an increase of the density which influences the refractive index of the sample.

According to another aspect of the invention, a method for detecting a molecule, in particular a trace gas species, in a sample using photothermal spectroscopy, comprises the steps of:

providing a probe laser beam, directing the probe laser beam through the sample in a first cavity of a Fabry-Perot interferometer, providing an excitation laser beam for heating the sample inside the first cavity of the Fabry-Perot interferometer, modulating the excitation laser beam wavelength, directing the modulated excitation laser beam through the sample in the first cavity of the Fabry-Perot interferometer, detecting a harmonic, in particular a second harmonic, of a modulation of the transmitted probe laser beam passed through the first cavity of the Fabry-Perot interferometer.

According to another aspect of the invention, a method for detecting a molecule, in particular a trace gas species, in a sample using photothermal spectroscopy, comprises:

providing a probe laser beam that can be tuned over a given wavelength range, directing the probe laser beam through the sample in a first cavity of a Fabry-Perot interferometer, tuning the probe laser beam in accordance with a predetermined value of a transmission function of the Fabry-Perot interferometer, providing an excitation laser beam for heating the sample in the first cavity of the Fabry-Perot interferometer, directing the excitation laser beam through the first cavity of the Fabry-Perot interferometer, detecting the transmitted probe laser beam passed through the first cavity of the Fabry-Perot interferometer.

This embodiment is particularly favorable when investigating varying sample compositions.

Preferably, the predetermined value of the transmission function of the FPI corresponds essentially to the inflection point of the transmission function of the FPI, which may be at essentially 75% intensity transmission through the FPI. In this embodiment, the probe laser beam is tuned such that the intensity of the transmitted probe laser beam corresponds to the predetermined value (given in percent of the intensity of the probe laser beam as emitted by the probe laser).

In a preferable embodiment, a lock-in amplifier is arranged for receiving an AC (alternating current) signal from the photo detector unit, whereas a DC (direct current) signal from the photo detector unit may be used for maintaining the emission frequency of the probe laser at the predetermined value, preferably essentially at the inflection point, of the transmission function of the Fabry-Perot interferometer.

BRIEF DESCRIPTION OF THE FIGURES

The invention is further explained with respect to an exemplary embodiment thereof. In the drawings.

DETAILED DESCRIPTION

Figure 1:
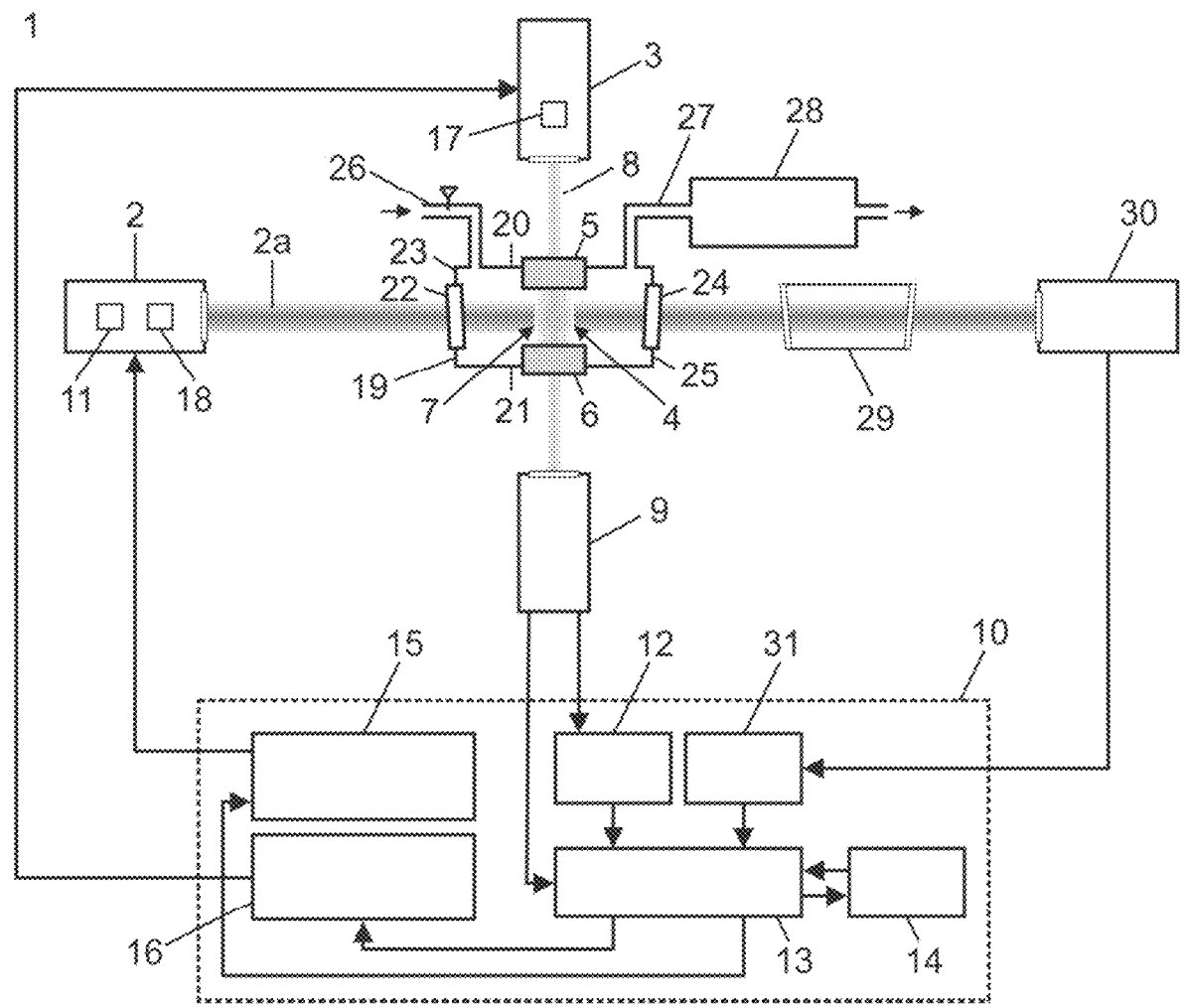
FIG. 1 shows a photothermal interferometry apparatus comprising a FPI, a probe laser and an excitation laser.

FIG. 1 depicts a photothermal interferometry apparatus 1 for determining the concentration of a molecule in a sample.

As can be seen from FIG. 1, the apparatus 1 for detecting refractive index changes employs an excitation laser 2 for sample heating and a probe laser 3 for monitoring changes resulting from heating. The change in the refractive index causes a phase shift of light passing through the heated sample which can be measured with high sensitivity using a Fabry-Perot interferometer (FPI) 4. The FPI 4 comprises a first mirror 5, a second mirror 6 and a first cavity 7 for containing a sample. The first cavity 7 extends between the first 5 and the second mirror 6. The first 5 and the second mirror 6 are arranged in parallel. Within the two parallel partially reflecting mirrors 5, 6 a probe laser beam 8 undergoes multiple reflections.

The apparatus 1 further comprises a photodetector unit 9 for detecting the transmitted probe laser beam 8 passed through the first cavity 7 of the Fabry-Perot interferometer 4. The photodetector unit 9 is connected to an electronic control unit 10 (shown with dotted lines in FIG. 1). Refractive index changes can be detected by measuring the transmitted probe laser beam intensity through the FPI 4, which is dependent on the phase shift of the probe laser beam 8. The control unit 10 will be explained in greater detail below.

In the shown embodiment, the photothermal interferometry apparatus 1 further comprises a modulator 11 for modulating the wavelength of an excitation laser beam 2a emitted by excitation laser 2. The photodetector 9 is arranged for detecting a modulation of the probe laser beam 8 as passed through the first cavity 7 of the Fabry-Perot interferometer 4. For this purpose, the control unit 10 comprises a lock-in amplifier 12 receiving an AC (alternating current) component of the transmission signal generated by the photodetector unit 9 from the transmitted probe laser beam 8. The lock-in amplifier 12 communicates with a data acquisition unit 13, which also receives the DC (direct current) component of the transmission signal from the photodetector unit 9. The data acquisition unit 13 is connected to a computer 14 having a user interface. In this way, the control unit 10 is arranged for determining a second harmonic of the modulation of the probe laser beam 8 passed through the first cavity 7 of the Fabry-Perot interferometer 4.

As can be seen from FIG. 1, the control unit 10 further comprises an excitation laser driver 15 driving current and temperature of the excitation laser 2 and a probe laser driver 16 driving current and temperature of the probe laser 3. The data acquisition unit 13 communicates both with the excitation laser driver 15 and the probe laser driver 16.

As can be seen from FIG. 1, photothermal interferometry apparatus 1 comprises a first tuner 17 for tuning the probe laser beam 8 over a first given wavelength range. Also, a second tuner 18 is arranged for tuning the excitation laser beam 2a over a second given wavelength range. For this purpose, the excitation laser 2 may be a continuous wave quantum cascade laser or interband cascade laser. On the other hand, the probe laser 3 may be a fiber coupled single-mode tunable continuous wave diode laser.

Figure 3:
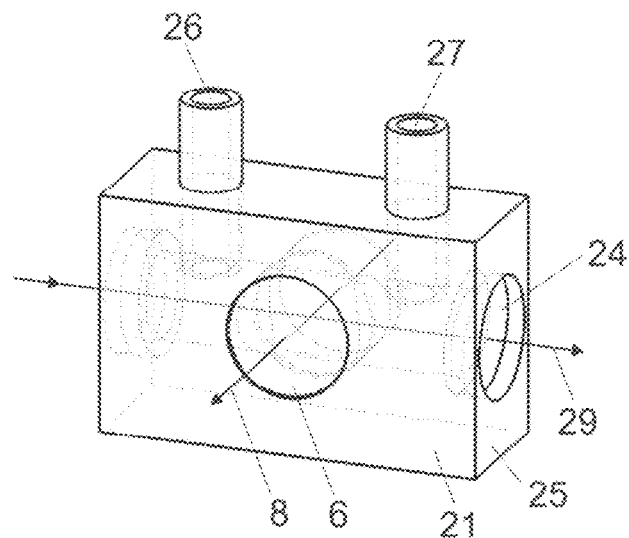
FIG. 3 shows a gas cell for use in a photothermal interferometry apparatus according to FIG. 1 or 2.

As can be seen from FIG. 1 (and in greater detail from FIG. 3), the Fabry-Perot interferometer 4 comprises a sample cell 19 for containing the sample. The first 5 and the second mirror 6 are fixed on a first side 20 and a second side 21 of the sample cell 19, respectively, the first side 20 and second side 21 being arranged opposite one another. In this way, the first 5 and second mirror 6 are arranged in a constant distance from each other. Furthermore, sample cell 19 comprises an entry window 22 on a third side 23 and an exit window 24 on a fourth side 25 of the sample cell 19. The third 23 and fourth side 25 are arranged opposite one another. In the shown embodiment, the sample cell 19 is essentially box-shaped.

The sample cell 19 of the Fabry-Perot interferometer 4 further comprises a sample inlet 26 for introducing the sample, preferably a trace gas, into the first cavity 7 and a sample outlet 27 for removing the sample from the first cavity 7 of the FPI 4. In the shown embodiment, a vacuum device 28 is connected to the sample outlet 27 of the Fabry-Perot interferometer 4.

The photothermal interferometry apparatus 1 may also comprise a reference cell 29 containing the sample. The reference cell 29 is arranged, when seen in direction of propagation of the excitation laser beam 2a, behind the first cavity 7 of the Fabry-Perot interferometer 4. The excitation laser beam 2a is passed through the reference cell 29 after passing through the first cavity 7 of the Fabry-Perot interferometer 4. The apparatus 1 comprises a photo diode 30 for detecting the excitation laser beam 2a after it emerges from the reference cell 29. The photo diode 30 generates an output signal that is communicated to a further lock-in amplifier 31 demodulating an odd harmonic, preferable the third harmonic of the transmitted excitation laser beam. The further lock-in amplifier 31 is connected to the data acquisition unit 13.

The shown apparatus 1 provides for a robust and compact sensor arrangement without the use of moveable parts using a fixed spaced FPI 4.

Figure 2:
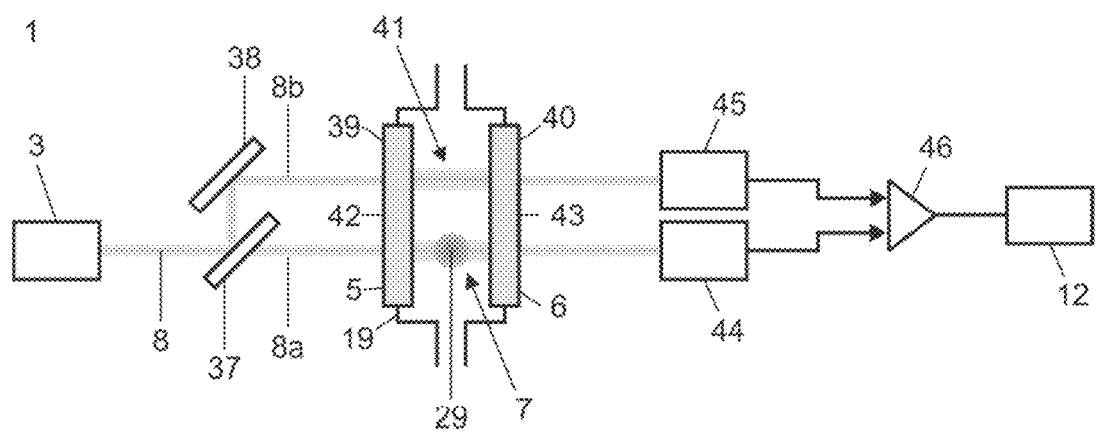
FIG. 2 shows a photothermal interferometry apparatus according to another embodiment of the invention.

FIG. 2 shows a variant of the photothermal interferometry apparatus 1 of FIG. 1. In this embodiment, a beam splitter 37 is arranged for splitting the probe laser beam 8 into a first probe laser beam 8a and a second probe laser beam 8b. The second probe laser beam 8b is deflected by 90° with mirror 38 such that first 8a and second probe laser beam 8b run in parallel before hitting sample cell 19. The Fabry-Perot interferometer 4 comprises a third mirror 39, a fourth mirror 40 and a second cavity 41 for containing the same sample as in first cavity 7. The second cavity 41 extends between the third 39 and the fourth mirror 40. In the shown example, the first 5 and the third mirror 39 are formed by a first and a second section of a first mirror element 42, while the second 6 and the fourth mirror 40 are formed by a third and a fourth section of a second mirror element 43 such that the first 7 and the second cavity 41 extend continuously between the first 42 and second mirror element 43. In this way, the first 7 and second cavity 41 are formed in the same sample cell 19.

However, in another embodiment (not shown), the second cavity 41 is separate from the first cavity 7. For this purpose, a second sample cell (not shown) may comprise third mirror 39, fourth mirror 40 and second cavity 41.

The set-up of FIG. 2 is arranged for a method including the steps of detecting a thermal wave in the sample with the transmitted first probe laser beam (8a) and detecting an acoustic wave in the sample with the transmitted second probe laser beam (8b).

In the shown embodiment, the first 7 and the second cavity 41 of the Fabry-Perot interferometer 4 are arranged such that the first probe laser beam 8a intersects with the excitation laser beam 2a in the first cavity 7 and the second probe laser beam 8b does not intersect with the excitation laser beam 2a in the second cavity 41.

The photodetector unit 9 comprises a first 44 and a second photo detector 45 for detecting the transmitted first probe laser beam 8a and the transmitted second probe laser beam 8b, respectively. A subtractor 46 is arranged for subtracting a second transmission signal corresponding to the transmitted second probe laser beam 8b from a first transmission signal corresponding to the first transmitted probe laser beam 8a. The subtractor 46 may additionally serve as an amplifier. The differential transmission signal is communicated to lock-in amplifier 12.

In the shown embodiment, the first probe laser beam 8a and the second probe laser beam 8b run essentially perpendicularly to the excitation laser beam 2a in the first cavity.

Figure 4:
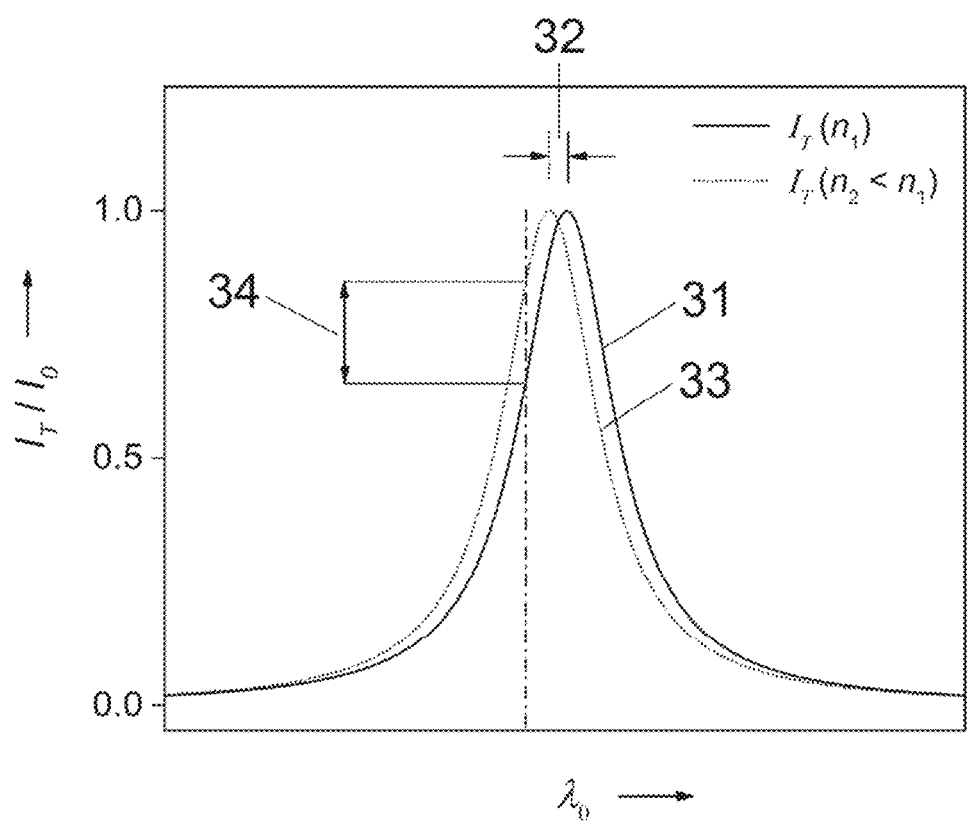
FIG. 4 shows the transmission function of the probe laser beam passed through a sample gas in the FPI.

FIG. 4 illustrates the operation principle of the photothermal interferometry apparatus 1. The transmitting function of the optical cavity 6 is given by the transmitted probe laser beam intensity IT in relation to the intensity $I_0$ of the probe laser beam over the wavelength $\lambda_0$ of the probe laser 3. As can be seen from FIG. 4, the transmission function of the optical cavity 6 for a sample is shifted when the sample is heated, due to a change of the refractive index. A phase shift is observed by probe laser 3 with fixed frequency and observed as a change of transmitted intensity through the FPI 4. Maximal sensitivity of transmission to variations in the phase delay is given in the vicinity of the inflection point of the periodic transmission function, which may be near 75% transmission of the FPI 4. At this point the slope of the function is maximum and roughly linear over a narrow range. The slope of the transmission function and thus the detectable signal is directly proportional to the finesse of the cavity, i.e. the higher the mirror reflectivity, the higher the sensitivity. This is, however, only true to the extent that the source of limiting noise is not similarly enhanced. Limiting noise sources may be introduced by phase and intensity noise of the probe laser source, as well as mechanical and acoustical noise inducing a cavity misalignment and refractive index changes by pressure changes of the media inside the FPI.

In FIG. 4, line 31 shows the transmission function at thermal equilibrium of the sample. The frequency of probe laser 3 is fixed near the inflection point of the transmission function. After photo-induced heating of the sample by excitation laser 2 the refractive index of the sample gas decreases, which is accompanied by a shift 32 of the transmission function (line 33). The shift is monitored by a change 34 of transmitted probe laser intensity.

In the photothermal interferometry apparatus 1 the distance between first 5 and second mirror 6 may be below 2 mm, preferably below 1.5 mm, for example 1 mm. This enables construction of an ultra-low volume sample cell 19 with a total volume of <0.7 $cm^3$ which can operate in a wide range of pressures and temperatures. Moreover, the presented setup may allow for further miniaturization of the apparatus 1 down to micro-electro-optical-system integration on a chip. Sample heating is performed by excitation laser 2, refractive index changes are monitored by probe laser 3 in transverse direction. Implementation of WM with modulator 11 may be achieved by modulating the injection current of the excitation laser 2. Sensitivity is accomplished by the small spacing of the first 5 and second mirror 6 together with the usage of a quantum cascade laser (QCL) as excitation laser 2 with which strong fundamental absorption of sample molecules in the mid-infrared (mid-IR) region can be targeted along with high laser power. Selectivity may be improved by employing WM and second harmonic detection preferably at reduced sample pressure. Furthermore, the modulation (detection) frequency may be selectable, due to the absence of any resonance. Detection of refractive index changes may be carried out with a probe laser 3 emitting in the vicinity of 1600 nm. This near infrared region offers matured technology where cheap optical components are available. However, it is understood that a great variety of probe laser wavelengths 3 could be used.

The FPI 4 used as transducer for monitoring induced refractive index changes may comprise two dielectric coated fused silica mirrors with a reflectivity of R=0.85, a diameter of 12.7 mm and a radius of curvature of 0.5 m. For example, a Finesse of 19.3 may be achieved. Refractive index changes inside the FPI 4 may be monitored by the use of a fiber coupled single-mode tunable continuous wave (CW) distributed feedback (DFB) diode laser housed in a butterfly-type 14 pin package (probe laser 3). The laser diode emitted at a wavelength around 1600 nm with a minimum fiber output power of 20 mW. The pigtail fiber output may be collimated with a fixed focus aspheric lens collimator at the connectorized FC/PC connector. Tuning of the probe laser 3 with first tuner 17 may be performed either by temperature or by injection current. The probe laser output may be coupled by a $CaF_2$ plano-convex lens (f=150 mm) into the FPI, whereas the transmitted laser intensity may be detected by a gallium indium arsenide (GaInAs) positive intrinsic negative junction (PIN) photodiode of photo detector unit 9 employing a custom made ultra-low noise transimpedance amplifier.

Heating of the sample gas inside the FPI 4 may be performed by the use of a collimated CW-DFB quantum cascade laser (QCL) emitting at 7.25 μm (excitation laser 2). Here as well, frequency tuning with second tuner 18 may be performed by QCL temperature and injection current, respectively. The corresponding tuning coefficients of the QCL were $c_T$=−0.10057 $cm^{-1}$ $K^{-1}$ and $c_I$=−0.00582 $cm^{-1}$ $mA^{-1}$. The QCL output beam was focused by a plano-convex $CaF_{2\ lens}$ (f=40 mm) in between the two mirrors 5, 6 forming the FPI 4, intersecting the standing wave of the probe laser beam 8 in transverse direction.

The two dielectric coated mirrors 5, 6 may be fixed to a compact aluminum sample cell 19 with a spacing of d=1 mm to each other. Transmission of the QCL beam through the sample cell 19 onto a beam dump may be enabled by $CaF_2$ windows (entry window 22, exit window 24), also fixed to the cell. Sample gas exchange may be performed by a gas inlet 26 and gas outlet 27.

In a practical example of the sample cell 19, the outer dimensions of the sample cell 19 were 40×15×25 mm, whereas the sample gas volume inside was approximately 0.7 $cm^3$. If necessary, this value can be easily reduced towards much smaller values down to a few $mm^3$ by usage of mirrors 5, 6 with smaller diameter, as well as a through hole with lower diameter for QCL beam propagation and closer mirror spacing.

The sensor platform may be based on PT sample excitation via WM and second harmonic (2f) detection of the transmitted probe laser beam 8 intensity through the FPI 4, which may be performed by demodulation of the alternating current (AC) of the photodetector (PD) signal of photo detector unit 9 at 2f using a lock-in amplifier (LIA) 12. The direct current (DC) PD component may be used to maintain the emission frequency of the probe laser 3 at the inflection point of the transmission function of the FPI 4, which is the maximum of its first derivative.

In order to implement the WM technique the emission wavelength of the QCL laser (excitation laser 2) may be modulated with the frequency $f_{mod}$ by adding a sinusoidal modulation to the DC current input. Spectral data of the sample gas may be acquired by slowly tuning (mHz) the excitation laser frequency over the desired spectral range (1380 $cm^{-1}$ to 1379.6 $cm^{-1}$) by tuning the DC injection current component with a sawtooth function. A modulation of the transmitted probe laser intensity was induced when the density of the sample in between the optical cavity is altered by absorption of the excitation laser beam 2a. The detected photodiode LIA data may be digitized by a 24 bit data acquisition card for further data processing, which may be carried out by transferring the digitized data to computer 14.

The pressure and flow of the sample gas inside the FP-PTI cell (sample cell 19) may be controlled and maintained by using a metering valve, a mini diaphragm vacuum pump, a pressure sensor and a pressure controller forming the pressure adjustment unit (vacuum device 28).

The functional principle of the apparatus 1 may be tested using a modulation frequency of $f_{mod}$=500 Hz, a LIA time constant set to $\tau$=1 second and a tuning frequency of 10 mHz. The pressure and flow of the sample gas may be kept constant at p=200 mbar and v=110 ml min$^{-1}$.

EXAMPLE

In an example, sulfur dioxide ($SO_2$) was chosen as target molecule due to strong absorption in the spectral region of the used QCL (excitation laser 2).

Spectral scans for different $SO_2$ concentration levels were performed by tuning the QCL (excitation laser 2) frequency via the injection current. For the selected $SO_2$ absorption line centered at 1379.78 cm$^{-1}$ the measured optical power emitted by the QCL (excitation laser 2) was ~173 mW (T=288.65 K, I=416 mA). The QCL beam (excitation laser beam 2a) was focused between the gap formed by the two cavity mirrors 5, 6 with high transmission efficiency (>99.9%). Taking absorption of the plano-convex lens and optical window of the sample cell into account (8% and 6%, respectively) an optical power of ~150 mW was directed through the two mirrors.

Figure 5:
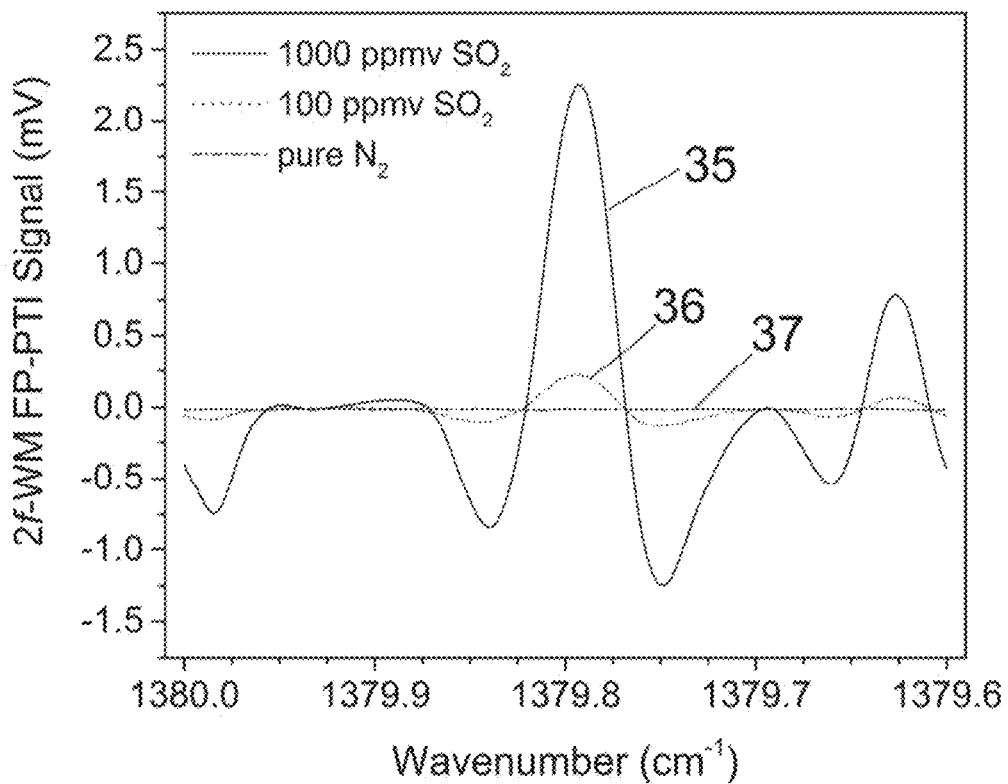
FIG. 5 shows the 2f WM FP-PTI spectra of $SO_2$ obtained with the apparatus of FIG. 1 when the excitation laser frequency was tuned over the absorption line centered at 1379.78 $cm^{-1}$.

FIG. 5 shows 2f WM FP-PTI spectra of $SO_2$ at reduced pressure of p=200 mbar when the QCL frequency was tuned over the absorption line centered at 1379.78 cm$^{-1}$. Line 35 relates to 10000 ppmv $SO_2$, line 36 relates to 100 ppmv $SO_2$ and horizontal line 37 relates to pure $N_2$.

Figure 6:
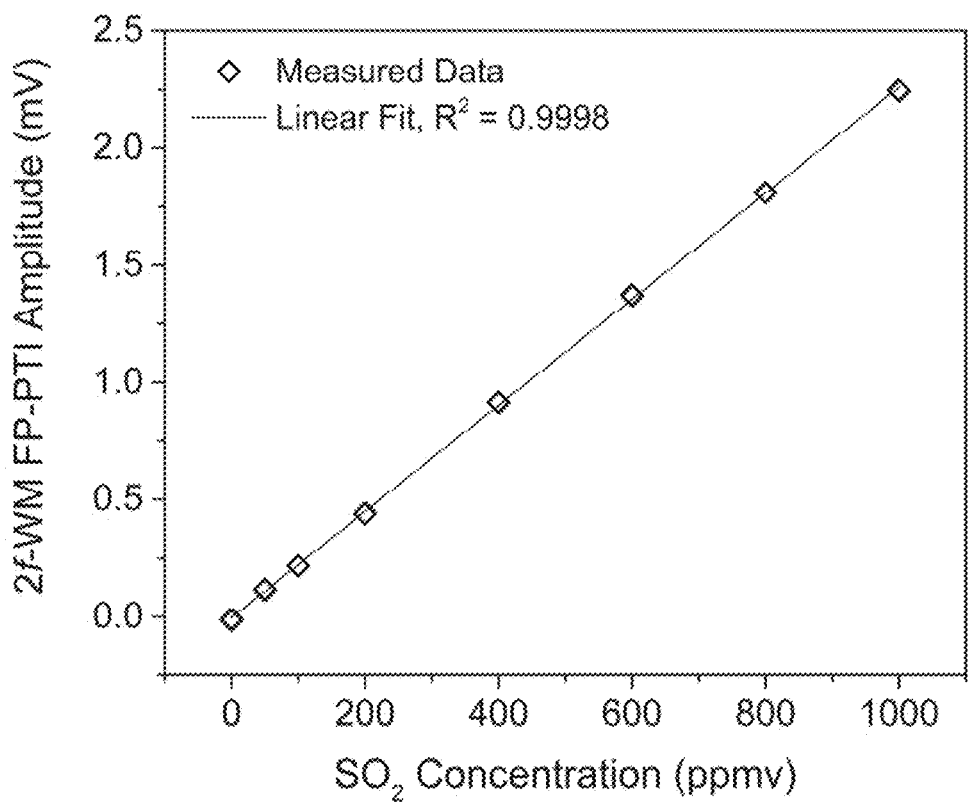
FIG. 6 shows the linear dependence of measured $SO_2$ signal amplitudes versus sample gas concentration.

The evaluation of the FP-PTI sensors sensitivity and linearity as a function of the $SO_2$ concentration was investigated by recording spectra within the concentration range from 0 to 1000 ppmv. Measured results for two different $SO_2$ concentrations in $N_2$ together with the sensor noise when the cell was flowed only by pure $N_2$ are illustrated in FIG. 5. The dependence of all measured signal amplitudes versus $SO_2$ concentrations yielded excellent linearity with a calculated R-square value of 0.9998 shown in FIG. 6.

Based on the measured signal amplitude of 1000 ppmv $SO_2$ and the standard deviation of the noise level of pure $N_2$ a signal-to-noise ratio of 935 was calculated, which yields a 1$\sigma$ minimum detection limit (MDL) of 1.07 ppmv for a 1 sec acquisition time. The corresponding normalized noise equivalent absorption (NNEA) coefficient using a the minimum detectable absorption coefficient of $\alpha_{min}$=3.3×10$^{-6}$ for 1 cm, an optical excitation power of 150 mW and a detector bandwidth of 78 mHz=($\tau$=1 s, 24 dB/oct low-pass filter) was recalculated to be 1.78×10$^{-6}$ cm$^{-1}$ W Hz$^{-1/2}$.

This example illustrates the advantages of the shown apparatus 1 with respect to selectivity, sensitivity and ultra-small absorption volumes. The setup demonstrates a robust and compact sensor arrangement without the use of any moveable part which can operate in a wide temperature and pressure range. The sensor is based on PT sample excitation and monitoring of the induced refractive index changes using a fixed spaced low-finesse (F=19.3) FPI with a mirror distance of 1 mm. WM and second harmonic detection was implemented using a CW-DFB-QCL as excitation source and a CW-DFB diode laser as probe source tuned to the inflection point of one transmission function of the FPI. The 2f WMS technique significantly increases simultaneously sensitivity and selectivity of the measurement where noise reduction is achieved by shifting detection to higher frequencies and by narrow band-pass detection. Selectivity is gained from the background free properties of the 2f WMS technique and operation at reduced pressure. The lasers were employed in transverse direction, due to the simple alignability, as well as to avoid heating of the FPI mirrors, which can cause the optical pathlength of the cavity to change. The functional principle of the sensor arrangement was shown for $SO_2$ sample gas in $N_2$ targeting the line centered at 1379.78 cm$^{-1}$. The MDL for $SO_2$ quantification was calculated to be 1.07 ppmv with a corresponding NNEA of 1.78×10$^{-6}$ cm$^{-1}$ W Hz$^{-1/2}$. Improvements in terms of sensitivity can be easily achieved by using a higher finesse FPI, which is simply enabled by mirrors with higher reflectivity. An increase in sensitivity, however, can only be achieved to the point to where the probe laser noise is not increased proportionally. The utilized probe laser 3 had a linewidth of approximately 2 MHz. Therefore, limiting noise arising from probe laser phase noise can greatly be improved by employing lasers with narrower linewidth, i.e. external cavity diode lasers, or actively stabilized sources with a bandwidth a few Hz or below. Improvements of noise introduced by misalignment of the FPI originating from mechanical vibrations or acoustic waves could be achieved by an efficient shielding surrounding the interferometer. Due to the fact that the PTS signal is directly proportional to the excitation laser power and inversely proportional to the excitation volume, this technique will greatly benefit from higher excitation power as well as further sensor miniaturization. Moreover, improvements in photodetector and preamplifier noise can be improved. Due to the lack of any resonance the modulation (detection) frequency can be freely selected. The WM technique enables the optionally use of an excitation reference channel, consisting of a reference cell and a photodetector signal demodulated at 3f. By this means the frequency of the excitation laser can be locked to the center of the selected absorption line. This static mode of WM operation can be used to increase sample quantification rate, as in the case of indirect absorption spectroscopy methods typical lock-in time constants of 100 to a few 100 ms are used. Therefore, spectral scans may take a few seconds to minutes, in contrast to single point quantification. By the frequency lock of the excitation laser long-term measurements with minimized drift can be realized. Thereby, optimum average time can be found for further sensitivity increase.

The invention claimed is:

1. A photothermal interferometry apparatus for detecting a molecule in a sample, comprising:
    a Fabry-Perot interferometer with a first mirror, a second mirror and a first cavity for containing the sample extending between the first and the second mirror, a probe laser arrangement with at least one probe laser for providing a first probe laser beam and a second probe laser beam, an excitation laser for passing an excitation laser beam through the first cavity of the Fabry-Perot interferometer for exciting the molecule in the sample, the Fabry-Perot interferometer comprising a third mirror, a fourth mirror and a second cavity for containing the sample extending between the third and the fourth mirror, the first and the second cavity of the Fabry-Perot interferometer being arranged such that the first probe laser beam intersects with the excitation laser beam in the first cavity and the second probe laser beam does not intersect with the excitation laser beam in the second cavity, and a photodetector unit comprising a first photo detector for detecting the transmitted first probe laser beam and a second photo detector for detecting the transmitted second probe laser beam.

2. The photothermal interferometry apparatus according to claim 1, wherein the probe laser arrangement comprises a beam splitter for splitting a probe laser beam from the probe laser into the first and second probe laser beam.

3. The photothermal interferometry apparatus according to claim 2, further comprising a subtractor for subtracting a second transmission signal corresponding to the transmitted second probe laser beam from a first transmission signal corresponding to the first transmitted probe laser beam.

4. The photothermal interferometry apparatus according to claim 2, wherein the first and the third mirror are formed by a first and a second section of a first mirror element, the second and the fourth mirror are formed by a first and a second section of a second mirror element such that the first and the second cavity extend continuously between the first and second mirror element.

5. The photothermal interferometry apparatus according to claim 1, further comprising a modulator for modulating the wavelength of the excitation laser beam, the photodetector unit being arranged for detecting a modulation of the transmitted probe laser beam passed through the first cavity of the Fabry-Perot interferometer.

6. The photothermal interferometry apparatus according to claim 5, wherein the photodetector unit communicates with a control unit arranged for determining a harmonic of the modulation of the probe laser beam passed through the first cavity of the Fabry-Perot interferometer.

7. The photothermal interferometry apparatus according to claim 6, wherein the control unit comprises a lock-in amplifier, and wherein the harmonic is a second harmonic.

8. The photothermal interferometry apparatus according to claim 1, further comprising a first tuner for tuning the probe laser beam over a first given wavelength range.

9. The photothermal interferometry apparatus according to claim 1, further comprising a second tuner for tuning the excitation laser beam over a second given wavelength range.

10. The photothermal interferometry apparatus according to claim 1, wherein the Fabry-Perot interferometer comprises a sample cell for containing the sample, the first and the second mirror being fixed on a first and second side of the sample cell.

11. The photothermal interferometry apparatus according to claim 10, wherein the sample cell of the Fabry-Perot interferometer comprises a sample inlet and a sample outlet.

12. The photothermal interferometry apparatus according to claim 11, further comprising a vacuum device connected to the sample outlet of the Fabry-Perot interferometer.

13. The photothermal interferometry apparatus according to claim 1, further comprising a reference cell containing the sample, the reference cell being arranged in the path of the excitation laser beam such that the excitation laser beam is passed through the sample in the reference cell, and a photo diode for detecting the excitation laser beam passed through the reference cell.

14. The photothermal interferometry apparatus according to claim 1, wherein the excitation laser is a diode laser, or a continuous wave quantum cascade laser, or a continuous wave distributed feedback quantum cascade laser, or an external cavity quantum cascade laser, or an interband cascade laser, and/or wherein the probe laser is a diode laser, or a single mode diode laser, or a continuous wave distributed feedback diode laser or an external cavity quantum cascade laser.

15. A method for detecting a trace gas species in a sample using photothermal spectroscopy, comprising the steps of: providing a first and a second probe laser beam, directing the first probe laser beam through the sample in a first cavity of a Fabry-Perot interferometer, directing the second probe laser beam through the sample in a second cavity of the Fabry-Perot interferometer, providing an excitation laser beam for heating the sample in the first cavity of the Fabry-Perot interferometer, directing the excitation laser beam through the sample in the first cavity of the Fabry-Perot interferometer, detecting the transmitted first probe laser beam, and detecting the transmitted second probe laser beam.

16. The method of claim 15, further comprising the step of subtracting a second transmission signal corresponding to the transmitted second probe laser beam from a first transmission signal corresponding to the transmitted first probe laser beam.

17. The method of claim 15, further comprising the steps of detecting a thermal wave in the sample with the transmitted first probe laser beam and detecting an acoustic wave in the sample with the transmitted second probe laser beam.

18. The method of claim 15, further comprising the steps of—modulating the excitation laser beam wavelength, directing the modulated excitation laser beam through the sample in the first cavity of the Fabry-Perot interferometer, detecting a harmonic of a modulation of the transmitted first probe laser beam passed through the first cavity of the Fabry-Perot interferometer.

19. The method of claim 15, further comprising the step of—tuning the probe laser beam in accordance with a predetermined value of a transmission function of the Fabry-Perot interferometer.

20. The photothermal interferometry apparatus according to claim 1, wherein the apparatus is for detecting a trace gas species.

* * * * *